3,428,426
AMMONIA STRIPPING PROCESS
Leroy L. Carney and Gerald G. Priest, Houston, Tex., assignors to Dixie Chemical Products Co., Houston, Tex., a corporation of Texas
Filed Nov. 30, 1966, Ser. No. 597,932
U.S. Cl. 23—193
Int. Cl. C01c 1/10
7 Claims

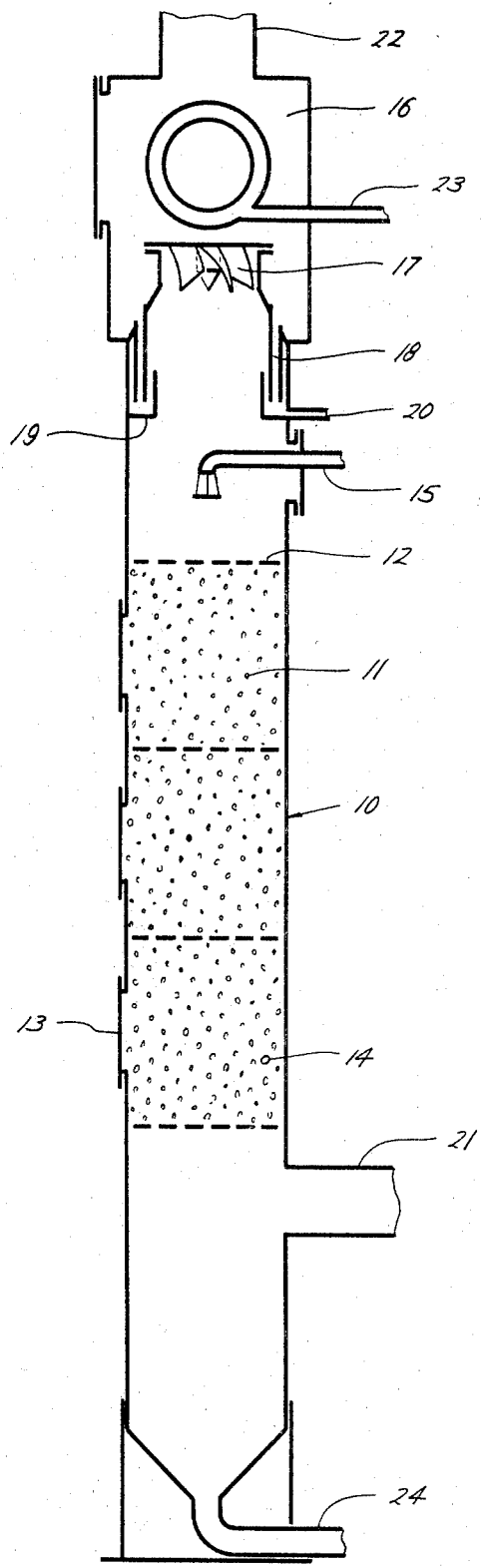
Gerald G. Priest
Leroy L. Carney
INVENTORS
BY Lee R. Larkin
Paul E. Harris
ATTORNEY United States Patent Office 3,428,426
Patented Feb. 18, 1969

ABSTRACT OF THE DISCLOSURE

A process which removes ammonia from aqueous systems such as ammonia base sulfite liquor which has been base exchanged with calcium. This is done by heating the ammoniated system to a predetermined temperature and passing it through a column of randomly moving small spheres. Hot air, gas or vapor is simultaneously counter-flowed through the column to maintain temperature control and to keep the small spheres in random motion.

BACKGROUND OF THE INVENTION

Field of the invention

This invention pertains to chemical processes for removing ammonia from aqueous systems.

Description of the prior art

Chemical processes for removing one or more constituents from an aqueous system include such techniques as scrubbing, absorption, adsorption, distillation, precipitation, and phase separation. Removal of constituents from sulfite liquors has been accomplished with packed absorption columns and with bubble-cap absorption towers. When such systems are used to remove ammonia from ammonium sulfite liquor which has been base exchanged with calcium they become fouled with calcium compounds. The process of this invention will remove ammonia from a calcium exchanged liquor without such fouling. It may therefor be operated on a continuous basis.

SUMMARY OF THIS INVENTION

An aqueous system containing ammonia is brought to a temperature sufficient to vaporize the ammonia from the aqueous solution. At this temperature the solution is gravitationally flowed through a vertical column having one or more "cages" containing a plurality of small inert spheres, preferably about one to two inches in diameter. Hot air, steam or other compatible gas, vapor or mixture thereof, is counter-flowed through the column. The hot gas must come in at a temperature sufficient to maintain ammonia vaporization throughout the system or be supplemented with ancillary heating. It must also be introduced at a velocity sufficient to "blow" the small spheres into a condition of dispersed random motion during processing. This latter action spreads the liquor over a very large surface area, relative to the volume of liquor which is within the caged zone of the column at any point in time. $NH_3$ separation, in gaseous state, from the aqueous phase is thereby enhanced. Random motion of the spheres also provides a continuous abrading action and thereby prevents fouling of the system.

BRIEF DESCRIPTION OF THE DRAWING

The drawing is a schematic of one type of column suitable for practice of the invention. Three sphere-containing cages are shown. The spheres are shown in dynamic condition. Above the sphere cages is an inlet for liquor and above that an $NH_3$ exhaust. Below the cages there is a hot air inlet and below that an outlet for the stripped liquor.

DESCRIPTION OF THE PREFERRED EMBODIMENT

According to present data, column 10 is preferably about thirty feet high and eighteen inches in diameter. It has three cages 11. These are formed by transverse grids 12 which are spaced along the mid-portion of column 10. Access to the cages 11 is had through removable covers 13. Each of cages 11 is charged with one inch polypropylene spheres 14, shown in dynamic condition. In static condition, spheres 14 rest on one of grids 12 and normally occupy approximately twenty-five percent of the cage volume.

At its upper portion, an inlet 15 is provided by an elbowed two inch pipe. Above inlet 15, column 10 is outfitted with an auxiliary heating chamber 16 which terminates in exhaust flue 22. A condensation surface, provided by vanes 17 is positioned intermediate column 10 and heating chamber 16. Supplementing vanes 17, are drain lines 18 and pan 19. Pan 19 receives condensate formed in heating chamber 16 and discharges it through tap 20.

Below cages 11, column 10 has a hot air inlet 21. Below inlet 21, column 10 terminates in a discharge line 24.

Practice of the preferred embodiment of this process is carried out, according to present data, by adjusting the pH of calcium exchanged ammonium sulfite liquor to 10.5 with addition of sodium hydroxide. 2 gallons of defoamer per 2,000 gallons of liquor are added. The defoamed adjusted liquor is brought to a temperature of from about 190° F. to about 210° F. and pumped into column 10 through inlet 15 at an initial rate of about 10 gallons per minute. Simultaneously, heated air and steam are brought in through inlet 21, the air being at 575° F. and 1,000 c.f.m. At the same time, steam is introduced into heating chamber 16 through jet 23. This is done to prevent re-absorption of exhausting $NH_3$ by the aqueous condensate formed at the top of column 10.

As promptly as the column commences output through discharge line 24, pH of the processed liquor is taken. If output pH exceeds 8.3, input rate is reduced until output pH drops to 8.3 or below. This is done because it has been observed that under these conditions the most effective results are had. Conversely, if initial output pH is below 8.3 input rate may be increased until a pH of 8.3 is attained. Thus controlled, the process will give maximum throughput consistent with efficient ammonia removal. Once throughput rate is adjusted the output pH is periodically taken and the throughput rate adjusted as indicated.

Processed liquor from line 24 is discharged into a deaeration drum and again treated with .1 gallon of defoamer per hundred gallons of liquor.

Released $NH_3$ rises through vanes 17 which adsorb entrained condensate resulting from evaporation taking place within the column. Those vapors which pass vanes 17 are substantially entirely $NH_3$. However, to provide maximum efficiency, chamber 16 is steam heated through jet 23 and subsequent condensate taken out through pan 19. $NH_3$ from chamber 16 is exhausted through stack 22.

Prior to processing, the calcium exchanged liquor typically contains 4% to 6% ammoniacal nitrogen. After processing it typically contains less than 0.03% ammoniacal nitrogen.

The foregoing describes only the one embodiment which present data show to be preferred. Such features as heat source, sphere size and composition, tower dimensions and defoaming agent may obviously be varied. When processing systems other than calcium exchanged ammonia base sulfite liquor, variation of other parameters will also be obvious.

We claim:

1. The method of removing ammonia from solution, comprising the steps of:
   heating the ammonia solution to a temperature of at least 182° F. to liberate $NH_3$;
   feeding a stream of said heated solution into a vertical column having a plurality of small spheres confined within a zone of said column said stream of solution entering above said zone to achieve downward gravitational flow of said solution through said zone;
   counter-flowing a stream of hot gas upwardly through said zone to maintain a temperature of at least 182° F. within said column and to achieve random motion of said spheres within said zone.

2. The method of removing ammonia from sulfite liquor, comprising the steps of:
   adjusting the pH of said liquor to about 10.5;
   heating said liquor to at least 182° F. to liberate $NH_3$;
   feeding said liquor into an upper portion of a vertical column, said column having a plurality of small spheres confined within a zone of said column below said upper portion, to achieve downward gravitational flow of said liquor through said zone;
   counter-flowing hot air upwardly through said zone to maintain the substances within said column at a temperature of at least 182° F. to liberate $NH_3$ within said column and to maintain said spheres in disperse randomly moving condition within said zone.

3. The method of claim 2 wherein the liquor input rate is adjusted to maintain a pH of about 8.3 or lower in the output liquor.

4. The method of claim 2 wherein the input and output liquor is treated with defoamer.

5. The method of claim 2 wherein said spheres comprise polypropylene and have a diameter of about 1.5 inches.

6. The process of claim 2 wherein said liquor is maintained at a temperature of about 190° F. to 210° F. during processing.

7. The process of claim 2 wherein $NH_3$ is recovered from the hot air.

References Cited

UNITED STATES PATENTS

| | | | |
|---|---|---|---|
| 1,943,345 | 1/1934 | Richardson | 23—193 |
| 2,692,244 | 10/1954 | Kunin et al. | 260—2.2 |
| 2,781,244 | 2/1957 | Hecklinger | 23—193 |

FOREIGN PATENTS 503,550   4/1939   Great Britain.

OSCAR R. VERTIZ, *Primary Examiner.*

HOKE S. MILLER, *Assistant Examiner.*

U.S. Cl. X.R.

23—1, 196, 270; 55—54, 70, 80, 159